(12) United States Patent
Stanford

(10) Patent No.: US 8,996,369 B2
(45) Date of Patent: *Mar. 31, 2015

(54) SYSTEM AND METHOD FOR TRANSCRIBING AUDIO FILES OF VARIOUS LANGUAGES

(75) Inventor: Joey Stanford, Longmont, CO (US)

(73) Assignee: Nuance Communications, Inc., Burlington, MA (US)

( * ) Notice: Subject to any disclaimer, the term of this patent is extended or adjusted under 35 U.S.C. 154(b) by 378 days.

This patent is subject to a terminal disclaimer.

(21) Appl. No.: 11/847,775

(22) Filed: Aug. 30, 2007

(65) Prior Publication Data

US 2008/0052062 A1 Feb. 28, 2008

Related U.S. Application Data

(63) Continuation of application No. 10/696,113, filed on Oct. 28, 2003, now Pat. No. 7,321,852.

(51) Int. Cl.
*G10L 15/00* (2013.01)
*G10L 21/00* (2013.01)
(Continued)

(52) U.S. Cl.
CPC .... *G06F 17/30905* (2013.01); *G06F 17/30746* (2013.01); *G10L 15/265* (2013.01)
USPC ............................ 704/235; 704/231; 704/277

(58) Field of Classification Search
USPC ...................... 704/2, 3, 5, 6, 7, 231, 235, 277; 379/88.05, 88.06
See application file for complete search history.

(56) References Cited

U.S. PATENT DOCUMENTS 5,440,615 A * 8/1995 Caccuro et al. ............ 379/88.06
5,758,023 A * 5/1998 Bordeaux ..................... 704/232
(Continued)

OTHER PUBLICATIONS

Archived page of www.ifilm.com from Jan. 24, 2002. http://web.archive.org/web/20020124130040/http://www.ifilm.com/.*
(Continued)

*Primary Examiner* — Douglas Godbold
(74) *Attorney, Agent, or Firm* — Wolf, Greenfield & Sacks, P.C.

(57) ABSTRACT

System, method and program product for transcribing an audio file included in or referenced by a web page. A language of text in the web page is determined. Then, voice recognition software of the language of text is selected and used to transcribe the audio file. If the language of the text is not the language of the audio file, then a related language is determined. Then, voice recognition software of the related language is selected and used to transcribe the audio file. The related language can be related geographically, by common root, as another dialect of the same language, or as another language commonly spoken in the same country as the language of the text. Another system, method and program product is disclosed for transcribing an audio file included in or referenced by a web page. A domain extension or full domain of the web page and an official language of the domain extension or full domain are determined. Then, voice recognition software of the official language is used to attempt to transcribe the audio file. If the official language is not a language of the audio file, then a language related to the official language is determined. Then, voice recognition software of the related language is selected and used to transcribe said audio file. The related language can be related geographically, by common root, as another dialect of the same language, or as another language commonly spoken in the same country as the official language.

18 Claims, 5 Drawing Sheets

(51) Int. Cl.
*G06F 17/30* (2006.01)
*G10L 15/26* (2006.01)

(56) References Cited

U.S. PATENT DOCUMENTS

| | | | |
|---|---|---|---|
| 5,832,428 A | 11/1998 | Chow et al. | |
| 5,890,152 A | 3/1999 | Rapaport et al. | |
| 5,983,176 A | 11/1999 | Hoffert et al. | |
| 6,094,649 A | 7/2000 | Bowen et al. | |
| 6,366,882 B1* | 4/2002 | Bijl et al. | 704/235 |
| 6,370,543 B2 | 4/2002 | Hoffert et al. | |
| 6,493,744 B1 | 12/2002 | Emens et al. | |
| 6,738,738 B2* | 5/2004 | Henton | 704/2 |
| 6,993,471 B1* | 1/2006 | Flanagan et al. | 704/2 |
| 7,031,921 B2* | 4/2006 | Pitman et al. | 704/270.1 |
| 7,143,033 B2* | 11/2006 | Belenger et al. | 704/235 |
| 2001/0014891 A1 | 8/2001 | Hoffert et al. | |
| 2002/0010682 A1 | 1/2002 | Johnson | |
| 2002/0049727 A1 | 4/2002 | Rothkopf | |
| 2002/0091509 A1* | 7/2002 | Zoarez et al. | 704/6 |
| 2002/0123879 A1* | 9/2002 | Spector | 704/2 |
| 2002/0143530 A1* | 10/2002 | Pitman et al. | 704/231 |
| 2002/0161579 A1* | 10/2002 | Saindon et al. | 704/235 |
| 2002/0161580 A1* | 10/2002 | Taylor | 704/235 |
| 2003/0050784 A1* | 3/2003 | Hoffberg et al. | 704/270.1 |
| 2003/0093272 A1 | 5/2003 | Soufflet et al. | |
| 2003/0105589 A1 | 6/2003 | Liu et al. | |
| 2004/0006456 A1* | 1/2004 | Loofbourrow et al. | 704/4 |
| 2004/0098246 A1* | 5/2004 | Welch et al. | 704/3 |
| 2004/0158454 A1* | 8/2004 | Polanyi et al. | 704/4 |
| 2004/0167768 A1* | 8/2004 | Travieso et al. | 704/2 |
| 2005/0049880 A1* | 3/2005 | Roth et al. | 704/277 |
| 2005/0084078 A1* | 4/2005 | Miller et al. | 379/88.06 |

OTHER PUBLICATIONS

Van Thong et al., "Speechbot: an experimental speech-based search engine for multimedia content on the web," *IEEE Transactions on Multimedia* 4(1):88-96 (Mar. 1, 2002).

Siegler et al., "Improving the suitability of imperfect transcriptions for information retrieval from spoken documents," *IEEE Int'l Conf. on Acoustics, Speech & Signal Processing* 1:505-508 (Mar. 15-19, 1999).

Liao et al., "A novel post-classifier for search engine using hidden Markov model," *Machine Learning & cybernetics 2002, Proc. 2002 Int'l. Conf* 4:1926-1928 (2002).

Bertino et al., "A conceptual annotation approach to indexing in a Web-based information system," *Int'l. Conf. on Advance Issues of E-commerce & Web-based Info Systems, WECWIS*, pp. 160-165 (Apr. 8-9, 1999).

\* cited by examiner

SYSTEM AND METHOD FOR TRANSCRIBING AUDIO FILES OF VARIOUS LANGUAGES

This application is a continuation of application Ser. No. 10/696,113, filed Oct. 28, 2003 now U.S. Pat. No. 7,321,852, status allowed.

BACKGROUND OF THE INVENTION

The invention relates generally to computer systems, and deals more particularly with program tools to gather web pages containing audio files of different languages and transcribe the audio files for a search engine repository or other use.

Web search engines such as "Google.com" and "Yahoo-.com" are well known today. The user can specify key words for a search, and the search engine will search its repository of web pages and files for those web pages or files which include the key words. Alternately, the user can specify a subject category such as "golf", and the search engine will search its repository of existing web pages and files for those web pages or files which were previously classifed/indexed by the search engine into the specified subject category.

Periodically, content gathering tools, called web crawlers or spiders, send out requests to other web sites to identify and download their web pages for storage in the search engine's repository. The web crawler goes to an initial web site specified by an administrator or identified by some other means. Some crawlers identify every page at the web site by navigating through the web site, and then download a copy of every web page to a storage repository of a search engine. This type of web crawler does not filter the web pages; it does not conduct any key word searching of the web pages that it identifies and downloads. Other web crawlers search text within the web pages for those web pages containing key words. The web crawler then downloads to the search engine repository a copy of only those web pages containing the key words. The search engine may index the web pages downloaded by either or both types of content gathering tools. A subsequent user of the search engine can then request all web pages in certain categories or conduct a key word search of the web pages in the repository, as described above. Both types of content gathering tools, after completing their investigation into the initial web site, can go to other web sites referenced by the initial web site or identified by some other means.

Some web pages reference or include audio files, alone or associated with a video file. It is also known for a content gathering program, when encountering a web page referencing or including an audio file, to invoke voice recognition software to attempt to transcribe the audio file into text so that the audio file can be indexed and searched by key words. See "Speechbot: An Experimental Speech-Based Search Engine for Multimedia Content on the Web" by Van Thong, et al., published IEEE Transactions on Multimedia, Volume 4, Issue 1, March 2002 pages 88-96. See also US 2003/0050784 A1 to Hoffberg et al. However, in some cases, difficulties have arisen in determining the language of the audio file, and therefore what voice recognition software to use and how to appropriately configure it for an accurate translation.

Accordingly, an object of the present invention is to determine a language of an audio file referenced by or included in a web page, so that the proper voice recognition software can be employed to transcribe the audio file.

SUMMARY OF THE INVENTION

The invention resides in a system, method and program product for transcribing an audio file included in or referenced by a web page. A language of text in the web page is determined. Then, voice recognition software of the language of text is selected and used to transcribe the audio file.

According to one feature of the present invention, if the language of the text is not the language of the audio file, then a related language is determined. Then, voice recognition software of the related language is selected and used to transcribe the audio file. The related language can be related geographically, by common root, as another dialect of the same language, or as another language commonly spoken in the same country as the language of the text.

The invention also resides in a system, method and program product for transcribing an audio file included in or referenced by a web page. A domain extension or full domain of the web page and an official language of the domain extension or full domain are determined. Then, voice recognition software of the official language is selected and used to transcribe said audio file.

According to another feature of the present invention, if the official language is not a language of the audio file, then a language related to the official language is determined. Then, voice recognition software of the related language is selected and used to transcribe said audio file. The related language can be related geographically, by common root, as another dialect of the same language, or as another language commonly spoken in the same region as the official language.

DETAILED DESCRIPTION OF THE PREFERRED EMBODIMENTS

Figure 1:
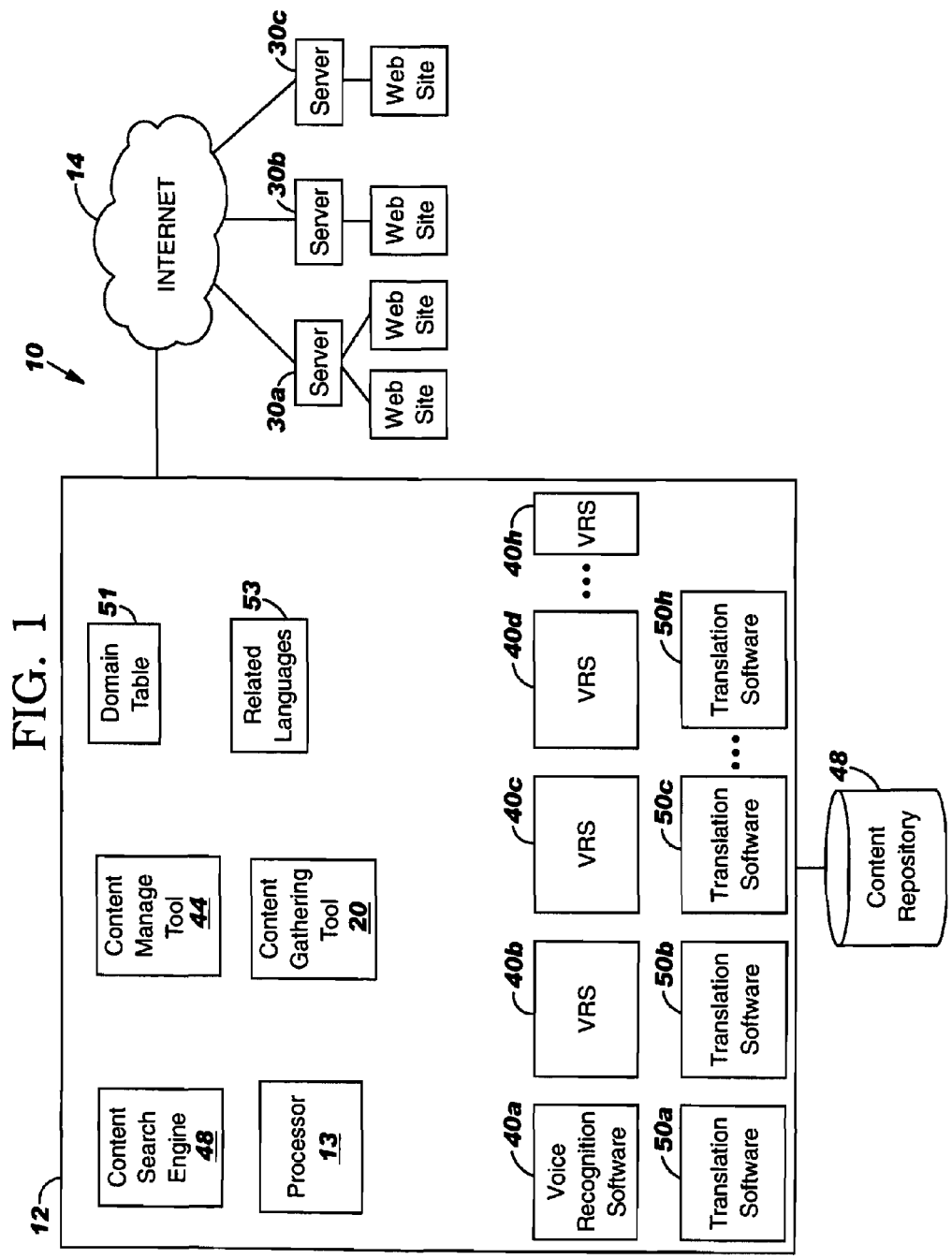
FIG. 1 is a block diagram of a computer system which includes the present invention.

Referring now to the drawings in detail, wherein like reference numbers indicate like elements throughout, FIG. 1 illustrates a computer system generally designated 10 in accordance with one embodiment of the present invention. System 10 includes a personal computer or computer workstation 12 connected to Internet 14. A multiplicity of content servers 30a,b ... n are also connected to the Internet. Each of the content servers can support one or more web sites as shown. A user can directly access the web pages from the web site by furnishing a URL for the web page. Workstation 12 includes a search engine 48 for users with web browsers. As described in more detail below, workstation 12 identifies and downloads web pages and related files from the web sites to generate a data base for the search engine. Typically, the web pages are furnished in HTML, XML, or related format, such as DHMTL, XHTML, etc., using TCP/IP protocol as the transmission medium. In this format, each of the web pages has meta data, headers, and format/display control information which is not displayed on a user's web browser. Typically, the web pages include some amount of text which is displayed on the web browser. Some of the web pages also include or reference files such as audio files which may be in any language. The web page text, and the text, audio and video files are considered "content".

Workstation 12 includes a content gathering tool 20 (such as a "web crawler" or "web spider"). Workstation 12 also includes a multiplicity of voice recognition software programs 40a,b,c,d . . . n, each recognizing and transcribing a different language. However, some of the voice recognition software programs may be able to recognize and transcribe more than one language. Workstation 12 also includes voice translation software programs 50a,b,c,d . . . n, each translating text of a different language into a base language such as English. However, some the translation software programs may be able to translate more than one language. In such cases, they are configured for specific languages as needed, and are then considered translation software of or for the specific language. Also, some software can perform both voice recognition and translation. Such software possesses transcription abilities as well as text to text translation such as found in SystranSoft's SYSTRAN™ Translation software. Workstation 12 also includes a content management tool 44 which processes the content gathered by tool 20 and determines the language of the audio files with the help of the voice recognition software. Content management tool 44 may also invoke search engine 48 to perform a key word search of an audio file after transcription, to determine whether the transcribed audio file should be included in a search engine repository 49. Content management tool 44 may also index (i.e. determine a subject category of) the content before storage in repository 49. The contents of repository 49 are available for presentation to users of search engine 48 upon their request for a key word search or category search. The users of search engine 48 may select a source language for the keywords and a target language for the results with which to search repository 49. Using text to text translation the keyword may be translated into a common language, such as English, to aid in the search process.

Figure 2:
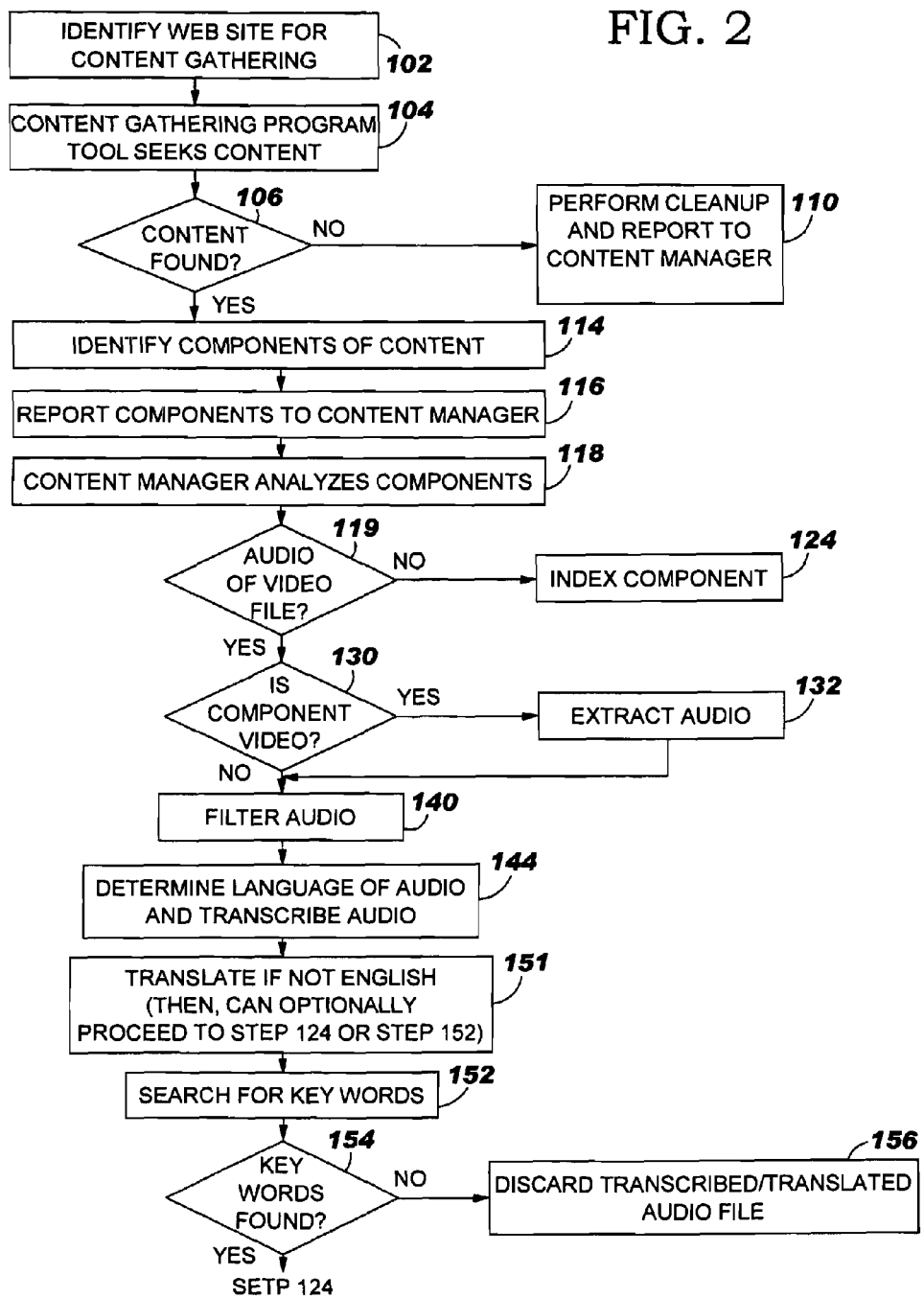
FIG. 2 is a flow chart illustrating operation of a content gathering tool and a content management tool within the computer system of FIG. 1.

FIG. 2 illustrates the operation of tools 20 and 44 in more detail. To begin the content gathering process, tool 20 identifies a web site to search (step 102). This identification may be based on a URL supplied by an administrator or a previously executed web crawler. Next, tool 20 searches for "content" at the site by navigating through the web site (step 104). "Content" comprises web pages (typically HTML format), text files, audio files, and/or video files within or referenced by a web page or separate from a web page (such as a publicly readable FTP directory or Internet News group) as previously described. This search is performed by the web crawler. If content is not found at the web site (decision 106, no branch), then program tool 20 performs "cleanup", i.e. expunges its working directory, memory space, and any temporary files and reports back to the content manager tool 44 that no content was found (step 110). Referring again to decision 106, if content, such as a web page and its referenced files, is found (decision 106, yes branch), then tool 20 identifies the types of components within the content (step 114). Tool 20 makes this identification by analyzing embedded control and formatting instructions inside the HTML as well as comparing file extensions found is the HTML to known (predefined) content types. Then, tool 20 reports these components to tool 44 (step 116). In response, tool 44 analyzes the report to determine the type of each component of the content, i.e. web page, or text, audio or video file (step 118). If the content component does not include any audio or video files (decision 119, no branch), then tool 44 performs prior art indexing or other processing of the content (step 124). However, if there is audio and/or video in the content component (decision 119, yes branch), then tool 44 determines if this component is video (decision 130). If so, tool 44 extracts the audio part of the video by using one of several known methods for extracting audio tracks from video formats (step 132). Then, tool 42 filters the audio (either extracted from the video or when existing without video) to remove noise and background sounds such as music as well as to normalize (i.e. the audio would be filtered to have consistent volume) the voice component (step 140). This filtering is performed by a known digital signal processing (DSP) process such as filtering the audio through a Texas Instruments DSP microchip called the "TMS320" or through a known software based filtering utility such as "eXpressDSP".

Figure 3A:
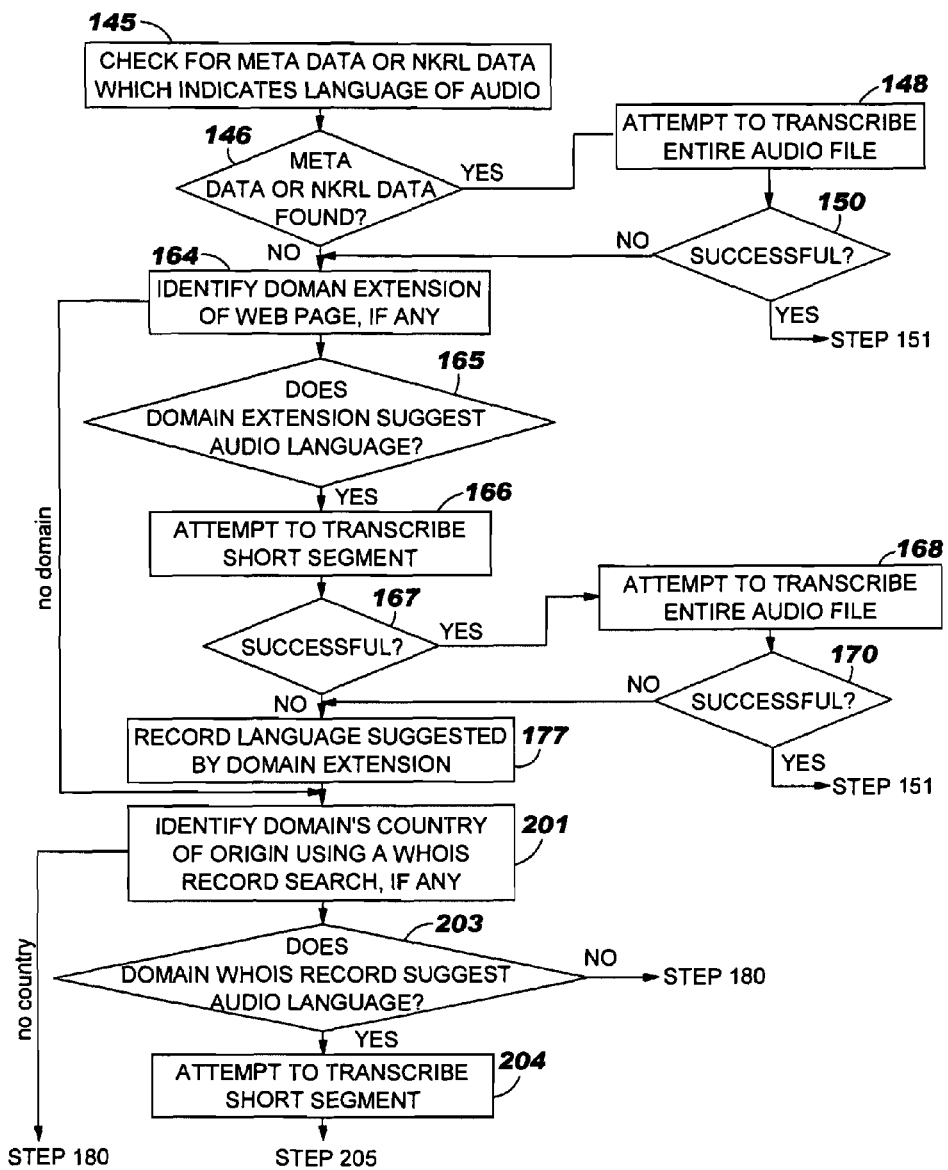
FIGS. 3(A), (B) and (C) form a flow chart which illustrates in more detail a process step within the flow chart of FIG. 2.
Figure 3B:
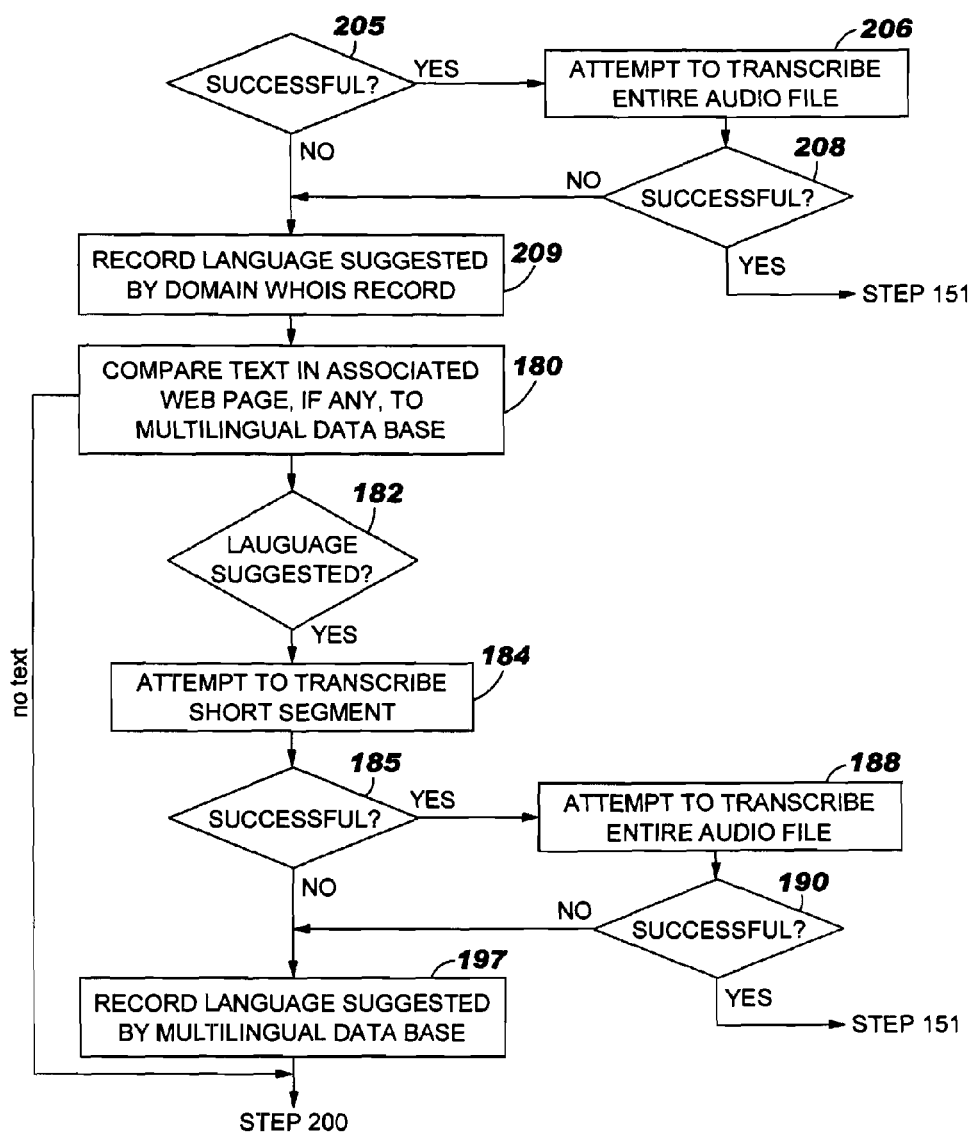
Figure 3C:
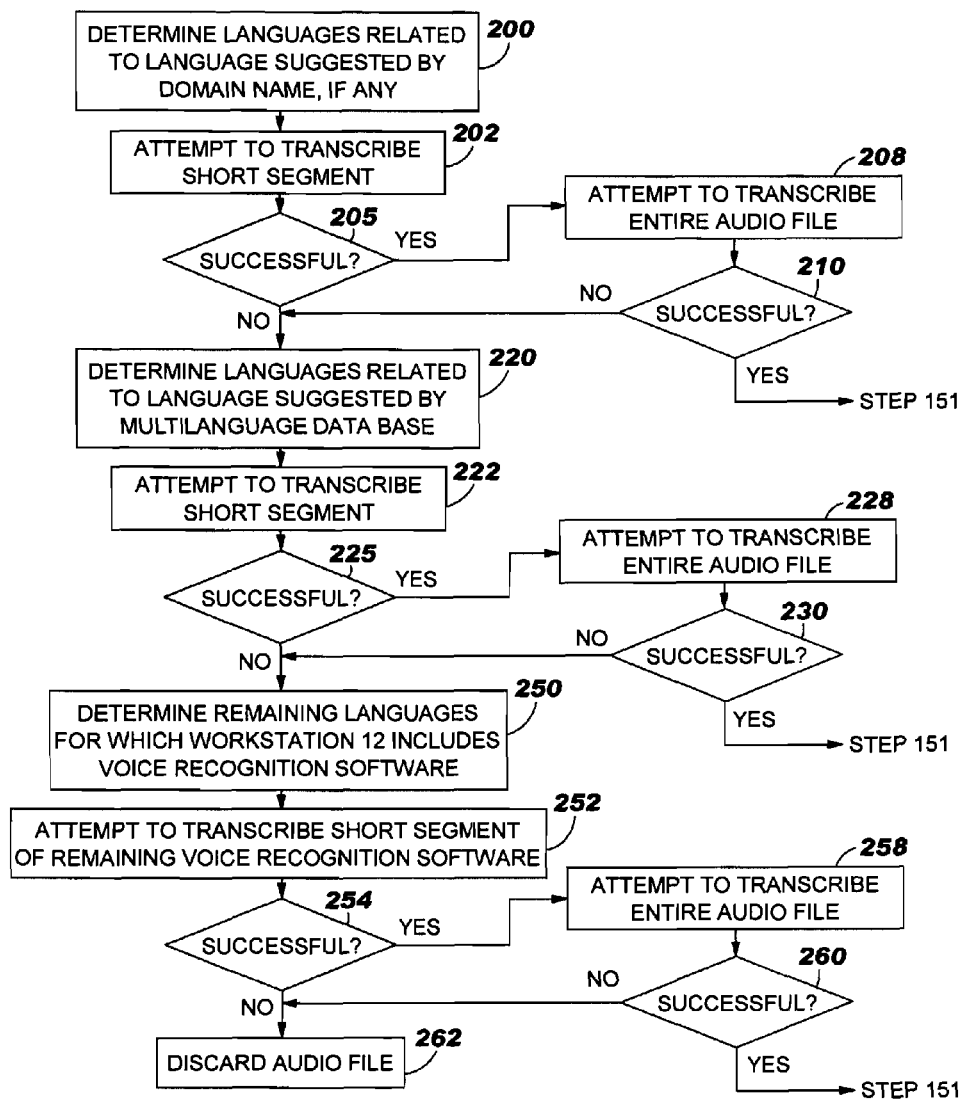

Next, the tool 44 attempts to determine the language of the audio file, i.e. English, French, German, Russian, etc. based on characteristics of the web page, and then transcribe the audio file into written text (process 144). Process 144 is illustrated in more detail in FIGS. 3(A-C). The first step in determining the language of the audio file is to check whether there is meta data or Narrative Knowledge Representation Language ("NKRL") data in the header of the subject HTML web page (decision 145). The meta data or NKRL data, if present, will ordinarily specify the language of the media file (i.e. audio alone or sound track of video). If such data is present and indicates the language of the associated media file (decision 146, yes branch), then tool 44 invokes the voice recognition software 40a,b,c,d . . . n for the language indicated by the meta data or NKRL data to attempt to transcribe the entire audio file (step 148). If the transcription is successful, i.e. no errors in transcription or a "normal" amount of errors (decision 150, yes branch), then tool 44 proceeds to step 151 to invokes one of the translation programs 50a,b,c . . . n for the language of the audio file transcription, to translate the transcribed audio file into a base language such as English. (Voice recognition software is generally specified as a certain percent accurate when applied to typical speech in the recognized language. So the "normal" amount of errors is the expected, statistical amount, or range of errors, when the voice recognition software is applied to typical speech in the recognized language.) Optionally, as shown in FIG. 2 by the arrow from step 151 to step 152, tool 44 can invoke search engine 49 to conduct a key word search of the transcribed and translated audio file (step 152). If the key words are found in the transcribed and translated audio file (decision 154, yes branch), then tool 44 proceeds to step 124 to index or otherwise process the transcribed and translated file as described above. If not, then the transcribed and translated audio file is discarded (step 156). According to the other option as shown in FIG. 2 by the arrow from step 151 to step 124, a key word search is not conducted, and tool 44 proceeds directly form step 151 to step 124 to index or otherwise process the transcribed and translated audio file.

Referring again to decision 146, no branch, i.e. where there is no meta data or NKRL data to indicate the language of the audio file, or decision 150, no branch, i.e. the transcription of the audio file was not successful, then tool 44 checks the domain extension of the web page, if any, associated with the audio file to attempt to learn the language of the audio file (step 164). For example, if the domain extension is ".es" for Espania this would suggest "Spanish" as the language of the audio file. Likewise, if the domain extension is ".de" for Deutchland this would suggest German as the language of the audio file. Likewise, if the domain extension is ".jp" for Japan this would suggest Japanese as the language of the audio file. If the domain is extension ".com", this would loosely suggest English as the language of the audio file because the ".com" domain extension began in the USA. However, the ".com" domain extension is widely used throughout the world so this domain extension is not as strong an indicator of the language of the audio file as the other domain extensions noted above. Some domain extensions such as ".name" would not suggest any nation or language. Tool 44 maintains a database 51 of domain extensions, which, if any, related country they suggest, and which, if any, language they suggest for their web page and audio file content. For example, the ".US" domain extension indicates the United States of America as the country and English as the language, the ".JP" domain extension indicates Japan as the country and Japanese as the language, etc. If there was no web page associated with the audio file, then there would be no domain extension to suggest a language of the audio file, and step 164 leads directly to step 180. However, if the audio file is associated with a web page with a domain extension that suggests a specific language (decision 165, yes branch), then tool 44 invokes the voice recognition software of the suggested language of the audio file to attempt to transcribe a short segment, for example twenty seconds of the audio file (step 166). If no errors occur or a normal amount of errors occur, this indicates that the suggested language indicated by the domain extension was correct (decision 167, yes branch), and tool 44 invokes the same voice recognition software 40*a,b,c,d* . . . or *n* (as suggested by the domain extension) to transcribe the entire audio file (step 168 of FIG. 1(B)). If the transcription is successful, i.e. no errors in transcription or a normal amount of errors (decision 170, yes branch), then tool 44 can proceed to step 151 as described above.

On all standard domains, there exists "registrant information" which usually contains the country of origin of the registrant. This information can be obtained through an Internet WHOIS search such as the one available on Network Solutions' Web site. For example, a search of "WHOIS IBM. COM" shows that the registrant, International Business Machines Corporation, is located in Armonk, N.Y., USA. From that information we can determine that IBM is located in the USA and map English as a suggested language, because English is the official language of the USA. Therefore, if (a) the language suggested by the domain extension is not the language of the audio file (decision 167, no branch, or decision 170, no branch), or (b) the domain extension of the web page does not suggest any specific language for the audio file (decision 165, no branch), then tool 44 performs a WHOIS record search on the full domain to identify the registrant's country of origin (step xxx) using the data contained in database 51 (step 201). If the country of origin data was unable to be retrieved (decision 203, no branch) then processing continues with step 180. However, if the audio file is associated with a web page with a WHOIS record that suggests a specific language (decision 203, yes branch), then tool 44 invokes the voice recognition software of the suggested language of the audio file to attempt to transcribe a short segment, for example twenty seconds of the audio file (step 204). If no errors occur or a normal amount of errors occur, this indicates that the suggested language indicated by the domain was correct (decision 205, yes branch), and tool 44 invokes the same voice recognition software 40*a,b,c,d* . . . or *n* (as suggested by the WHOIS record) to transcribe the entire audio file (step 206). If the transcription is successful, i.e. no errors in transcription or a normal amount of errors (decision 208, yes branch), then tool 44 proceeds to step 151 as described above. However, if (a) the language suggested by the full domain is not the language of the audio file (decision 208, no branch, or decision 205, no branch), or (b) the WHOIS record of the full domain does not suggest any specific language for the audio file (decision 203, no branch) then tool 44 records the languages suggested by the domain extension for future reference (step 209). In step 180, tool 44, analyzes text (content) words, if any, in the HTML web page associated with the audio file to determine their language. This analysis is made by comparing these words to words in a multi-lingual database to find a language match. Software programs, such as the SpeechDat™ program funded by the European Union, are currently known which can analyze text of an unknown language to determine its language, in this manner. If a preliminary match is found (decision 182, yes branch), then voice recognition software 26 attempts to transcribe a segment, for example twenty seconds, of the audio using voice recognition software for the language identified in step 180 (step 184). If no errors occur or a normal amount of errors occur, this indicates that the language identified in step 180 was correct (decision 185, yes branch). Then tool 44 invokes the same voice recognition software 40*a,b,c,d* . . . or *n* for the language of the audio file (as suggested by the multi-lingual database) to attempt to transcribe the entire audio file (step 188). If the transcription is successful, i.e. no errors in transcription or a normal amount of errors (decision 190, yes branch), then tool 44 proceeds to step 151 as described above. If the transcription is unsuccessful, then tool 44 records the language of the voice recognition software that was tried in step 188 for future reference (step 197). If there was no web page associated with the audio file or no text in the web page, then there would be no text (i.e. words) in the web page to compare to the multi-lingual data base, and step 180 leads directly to step 200.

The following describes the remaining steps of process 144 where the language of the audio file has not yet been determined by the foregoing tests, and the audio file has not yet been successfully transcribed. In such cases, tool 44 determines languages "related" to the language suggested by the domain extension in step 165 and recorded in step 177 (step 200). The related languages can be based on geographic proximity to the language originally suggested by the domain extension (such as German and Spanish if the language originally suggested by the domain extension is French, or other languages commonly spoken in the same country as the domain extension such as the Russian language when the domain extension is ".UA" for Ukraine), other dialects of the originally suggested language, or other languages having the same semantic root as the originally suggested language (such as another Romance language, another Germanic language, etc.). Tool 44 maintains a database 53 which lists each group of related languages. For example, the following geographic areas have geographically related spoken languages: Western Europe, Eastern Europe, South American, and Southeastern Asia. Each of these may then be broken down into related dialects. For example, if the language originally suggested by the domain extension is Chinese, the database 53 would suggest a list of the eleven related dialects: Mandarin, Jin, Jianghuai, Wu, Xiang, Gan, Hakka, Minbei, Minnan, Yue, and Pinghua. The foregoing are just examples of the many groups that are defined in data base 53. Then, tool 44 attempts to transcribe a segment, for example, twenty seconds of the audio file with voice recognition software for each of the languages related to the language suggested by the domain extension, one at a time (step 202). If no errors occur or a normal amount of errors occur, this indicates that the related language was correct (decision 205, yes branch), and tool 44 invokes the same voice recognition software 40*a,b,c,d* . . . *n* for the related language to transcribe the entire audio file (step 208 of FIG. 3(B)). If the transcription is successful, i.e. no errors in transcription or a normal amount of errors (decision 210, yes branch), then tool 44 proceeds to step 151 as described above.

However, if none of the languages related to the language suggested by the domain extension is correct, then tool 44 determines languages related to the language originally suggested by the multi-lingual database in step 182 (step 220). The related languages are determined as described above. Then, tool 44 attempts to transcribe a segment, for example, twenty seconds of the audio file with voice recognition software for each of these related languages, one at a time (step 222). If no errors occur or a normal amount of errors occur, this indicates that the related language is correct (decision 225, yes branch), and tool 44 invokes the same voice recognition software 40a,b,c,d . . . n for the related language to transcribe the entire audio file (step 228 of FIG. 1(B)). If the transcription is successful, i.e. no errors in transcription or a normal amount of errors (decision 230, yes branch), then tool 44 can proceed to step 151 to index or otherwise process the transcribed file as described above.

However, if none of the foregoing related languages is correct, tool 44 identifies the other voice recognition software stored in or accessible to workstation 12 for other languages, not yet tried (step 250). Then, tool 44 attempts to transcribe a segment, for example, twenty seconds of the audio file with voice recognition software for each of these other languages, one at a time (step 252). If no errors occur or a normal amount of errors occur using any such voice recognition software, this indicates that the other language is correct (decision 254, yes branch), and tool 44 invokes the voice recognition software 40a,b,c,d . . . n for the language of the same audio file to transcribe the entire audio file (step 258). If the transcription is successful, i.e. no errors in transcription or a normal amount of errors (decision 260, yes branch), then tool 44 proceeds to step 151 as described above. If none of the foregoing transcriptions is successful, then tool 44 discards the audio file (step 262).

Based on the foregoing, a system, method and program product for transcribing audio files of various languages has been disclosed. However, numerous modifications and substitutions can be made without deviating from the scope of the present invention. For example, if the language indicated by the domain extension is incorrect, the next step could be to test the languages related to the language indicated by the domain extension, instead of proceeded next to test the language suggested by the multi-lingual data base. Therefore, the invention has been disclosed by way of illustration and not limitation, and reference should be made to the following claims to determine the scope of the present invention.

The invention claimed is:

1. A method, comprising:
analyzing, using a computer, metadata associated with a web page to identify a language of text in the web page and, after failing to identify the language of the text in the web page from the metadata associated with the web page, determining the language of the text in said web page by analyzing at least some of the text in the web page,
responsive to determining said language, successively selecting voice recognition software programs from among a plurality of available voice recognition software programs and, for each selected voice recognition software program, using the selected voice recognition software program to transcribe at least a portion of an audio file associated with the web page,
wherein successively selecting voice recognition software programs comprises selecting a first voice recognition software program configured to transcribe spoken input of said language of the text, selecting a second voice recognition software program configured to transcribe spoken input of a language related to the language of said text, and selecting a third voice recognition software program.

2. A method as set forth in claim 1 wherein, analyzing at least some of the text comprises comparing at least some of the text to words of a multi-lingual database to identify a match.

3. A method as set forth in claim 1, wherein the language related to the language of said text is related geographically to the language of said text.

4. A method as set forth in claim 1, wherein the language related to the language of said text is another dialect of the language of said text.

5. A method as set forth in claim 1, wherein the language related to the language of said text shares a common root with the language of said text.

6. A method as set forth in claim 1, wherein the language related to the language of said text is commonly spoken in a same country as the language of said text.

7. A system, comprising:
a computer system programmed to:
analyze metadata associated with a web page to identify a language of text in the web page, and, after failing to identify the language of the text in the web page from the metadata associated with the web page, determine the language of the text in the web page by analyzing at least some of the text in the web page,
responsive to determining the language of the text in the web page, successively select voice recognition software programs from among a plurality of available voice recognition software programs and, for each selected voice recognition software program, use the selected voice recognition software program to transcribe at least a portion of an audio file associated with the web page,
wherein successively selecting voice recognition software programs comprises selecting a first voice recognition software program configured to transcribe spoken input of said language of the text, selecting a second voice recognition software program configured to transcribe spoken input of a language related to the language of said text, and selecting a third voice recognition software program.

8. The system of claim 7, wherein analyzing at least some of the text comprises comparing at least some of the text to words of a multi-lingual database to identify a match.

9. The system of claim 7, wherein the language related to the language of said text is related geographically to the language of said text.

10. The system of claim 7, wherein the language related to the language of said text is another dialect of the language of said text.

11. The system of claim 7, wherein the language related to the language of said text shares a common root with the language of said text.

12. The system of claim 7, wherein the language related to the language of said text is commonly spoken in a same country as the language of said text.

13. A computer readable device storing instructions which, when executed by a processor, cause performance of a method comprising:
analyzing metadata associated with a web page to identify a language of text in the web page and, after failing to identify the language of the text in the web page from the metadata associated with the web page, determining the language of the text in said web page by analyzing at least some of the text in the web page,
responsive to determining said language, successively selecting voice recognition software programs from among a plurality of available voice recognition software programs and, for each selected voice recognition software program, using the selected voice recognition software program to transcribe at least a portion of an audio file associated with the web page, wherein successively selecting voice recognition software programs comprises selecting a first voice recognition software program configured to transcribe spoken input of said language of the text, selecting a second voice recognition software program configured to transcribe spoken input of a language related to the language of said text, and selecting a third voice recognition software program.

14. The computer readable device of claim 13, wherein analyzing at least some of the text comprises comparing at least some of the text to words of a multi-lingual database to identify a match.

15. The computer readable device of claim 13, wherein the language related to the language of said text is related geographically to the language of said text.

16. The computer readable device of claim 13, wherein the language related to the language of said text is another dialect of the language of said text.

17. The computer readable device of claim 13, wherein the language related to the language of said text shares a common root with the language of said text.

18. The computer readable device of claim 13, wherein the language related to the language of said text is commonly spoken in a same country as the language of said text.

* * * * *